United States Patent
Lin et al.

(10) Patent No.: US 8,971,040 B2
(45) Date of Patent: Mar. 3, 2015

(54) HANDHELD DEVICE

(75) Inventors: Sheng-Chieh Lin, Taoyuan County (TW); Yi-Ting Suen, Taoyuan County (TW); Yu-Chang Chou, Taoyuan County (TW); Tsung-Yu Yu, Taoyuan County (TW); Hsueh-Lin Lu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 161 days.

(21) Appl. No.: 13/246,881

(22) Filed: Sep. 28, 2011

(65) Prior Publication Data

US 2013/0075411 A1   Mar. 28, 2013

(51) Int. Cl.
  *H05K 5/00* (2006.01)
  *G06F 1/16* (2006.01)
  *H04M 1/02* (2006.01)

(52) U.S. Cl.
  CPC ............ *G06F 1/1626* (2013.01); *G06F 1/1656* (2013.01); *H04M 1/0249* (2013.01)
  USPC .............. 361/679.56; 361/679.01; 361/679.3; 361/679.57; 361/679.58; 361/801; 361/804; 455/575.1; 455/575.8; 455/347; 455/90.3; 429/100; 220/676

(58) Field of Classification Search
  CPC . H04M 1/0262; B65D 50/045; H05K 5/0221; H05K 5/03
  USPC ........... 220/676; 429/100; 361/679.01, 679.3, 361/679, 56, 679.57, 679.58, 752, 801, 361/804; 455/575.1, 575.8, 347, 90.3
  See application file for complete search history.

(56) References Cited

U.S. PATENT DOCUMENTS

| 5,080,222 A * | 1/1992 | McNary ........................ 206/1.5 |
| 2010/0143777 A1 * | 6/2010 | Zhang et al. .................. 429/100 |

FOREIGN PATENT DOCUMENTS

| JP | 2003-308907 | 10/2003 |
| TW | 200644317 | 12/2006 |
| TW | 200924602 | 6/2009 |

OTHER PUBLICATIONS

"Office Action of German Counterpart Application" with the summary in English thereof, issued on May 2, 2013, p. 1-p. 10.
"Office Action of Taiwan Counterpart Application", issued on Jul. 16, 2013, p. 1-p. 6.
"Office Action of China Counterpart Application", issued on Nov. 24, 2014, p. 1-p. 7.

\* cited by examiner

*Primary Examiner* — Hoa C Nguyen
*Assistant Examiner* — James Wu
(74) *Attorney, Agent, or Firm* — Jianq Chyun IP Office

(57) ABSTRACT

A handheld device includes a body and a back cover. The body has a back portion covered by the back cover. The back cover includes a yielding layer and a rigid layer. The yielding layer has an outer surface and an inner surface opposite to each other. The inner surface faces the back portion. The rigid layer is formed on the inner surface and locked to the body. The rigid layer has a hole exposing the back portion and covered by the yielding layer. When a portion of the yielding layer corresponding to the hole is pressed, the portion of the yielding layer is elastically deformed to closely lean on the back portion, and the locked body and rigid layer are released due to a force between the portion of the yielding layer and the back portion, such that the back cover may depart from the body.

9 Claims, 6 Drawing Sheets

HANDHELD DEVICE

BACKGROUND

1. Technical Field

The present disclosure relates to a handheld device. More particularly, the disclosure relates to a handheld device having a body, and a back cover is configured on a back portion of the body.

2. Background

A handheld device refers to an electronic device which may be held and operated by a user, such as a mobile phone, a multimedia player, a personal digital assistant (PDA), a pocket PC, a handheld game console, and a handheld satellite navigator. These electronic devices usually have small volume and light weight, so that they may be carried around with ease.

For instance, a back portion of a body of an exemplary mobile phone has a corresponding connector or a terminal set in order to facilitate installation or replacement of a battery, a SIM card, a micro-memory card, or any other external component. Besides, a back cover of the mobile phone may be configured on the back portion of the body to protect the aforesaid components. At the same time, the overall appearance of the mobile phone is determined based on the outer profile of the back cover which is designed in consideration of the outline of the body.

To detachably fix the back cover of the mobile phone to the back portion of the body, a latching mechanism or a similar mechanism in another form is often configured between the body and the back cover. Thereby, the back cover may be combined to or detached from the body via a hook. Nonetheless, the latching mechanism or the similar mechanism in another form is often exposed to the surroundings, which poses a negative impact on the artistic design of the mobile phone.

SUMMARY

The disclosure is directed to a handheld device having a pleasing appearance and a back cover that may be easily detached.

In the disclosure, a handheld device that includes a body and a back cover is provided. The body has a back portion covered by the back cover. The back cover includes a yielding layer and a rigid layer. The yielding layer has an outer surface and an inner surface opposite to each other. The inner surface faces the back portion. The rigid layer is formed on the inner surface and locked to the body. The rigid layer has a hole exposing the back portion and covered by the yielding layer. When a portion of the yielding layer corresponding to the hole is pressed, the portion of the yielding layer is elastically deformed to closely lean on the back portion, and the body and the rigid layer that are locked to each other are released due to a force between the portion of the yielding layer and the back portion, such that the back cover is able to depart from the body.

Based on the above, the back cover described in the embodiments of the disclosure is constituted by the yielding layer and the rigid layer. The rigid layer has the hole that exposes the back portion of the body. A user may release the locked back over and body by pressing the portion of the yielding layer corresponding to the hole and exerting a force on the back portion of the body via the hole. Thereby, the back cover may be detached in a more efficient manner. The hole of the rigid layer is covered by the yielding layer and is thus not exposed to the external surroundings. Therefore, the handheld device may have a pleasing appearance.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION

Figure 1:
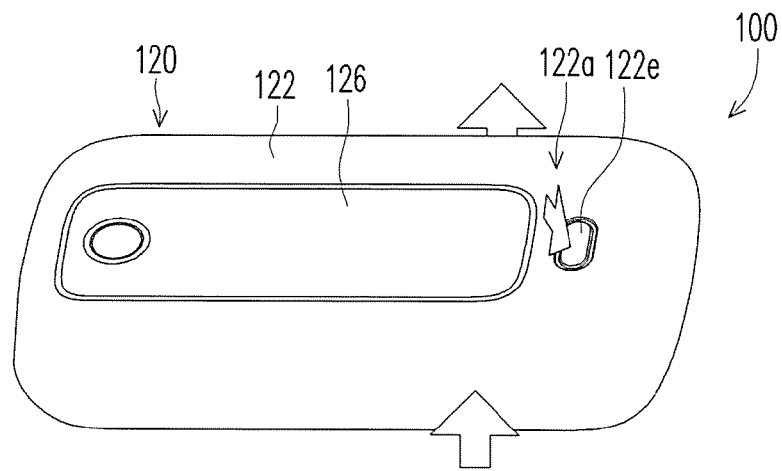
FIG. 1 is a three-dimensional view illustrating a handheld device according to an embodiment of the application.
Figure 2:
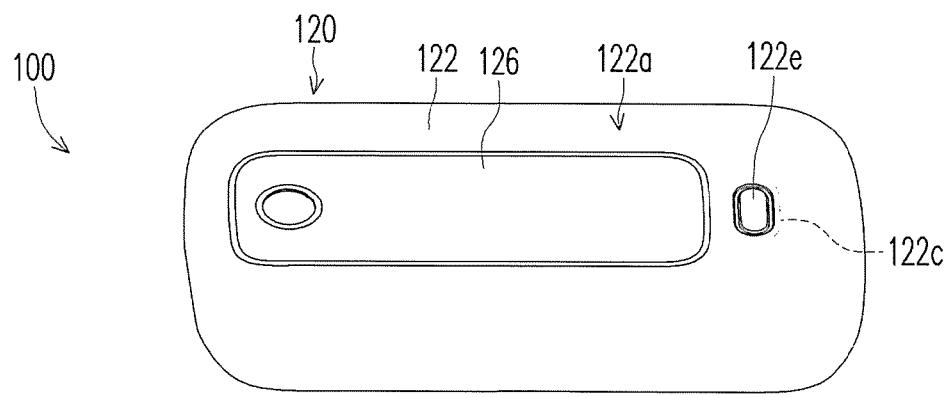
FIG. 2 is an explosive view illustrating the handheld device depicted in FIG. 1.
Figure 2:
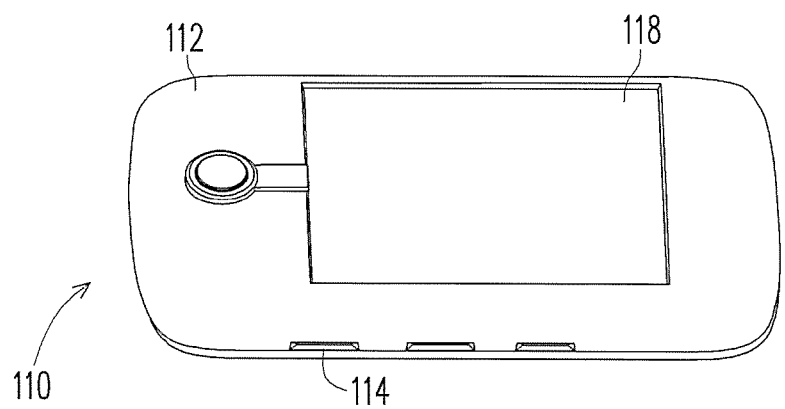
Figure 3:
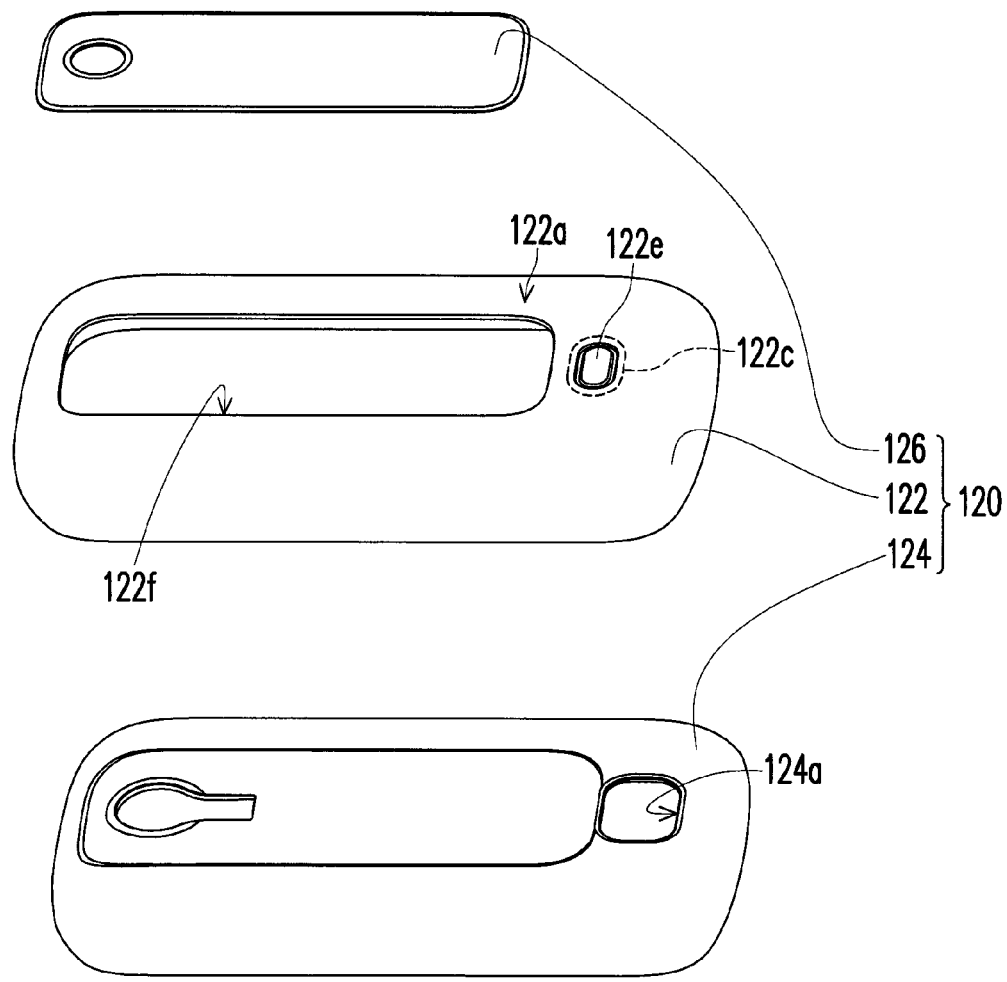
FIG. 3 is an explosive view illustrating the back cover depicted in FIG. 1.

FIG. 1 is a three-dimensional view illustrating a handheld device according to an embodiment of the application. FIG. 2 is an explosive view illustrating the handheld device depicted in FIG. 1. FIG. 3 is an explosive view illustrating the back cover depicted in FIG. 1. With reference to FIG. 1 to FIG. 3, a handheld device 100 described in this embodiment includes a body 110 and a back cover 120. The body 110 has a back portion 112. The back cover 120 serves to cover the back portion 112 and includes a yielding layer 122 and a rigid layer 124.

Figure 4:
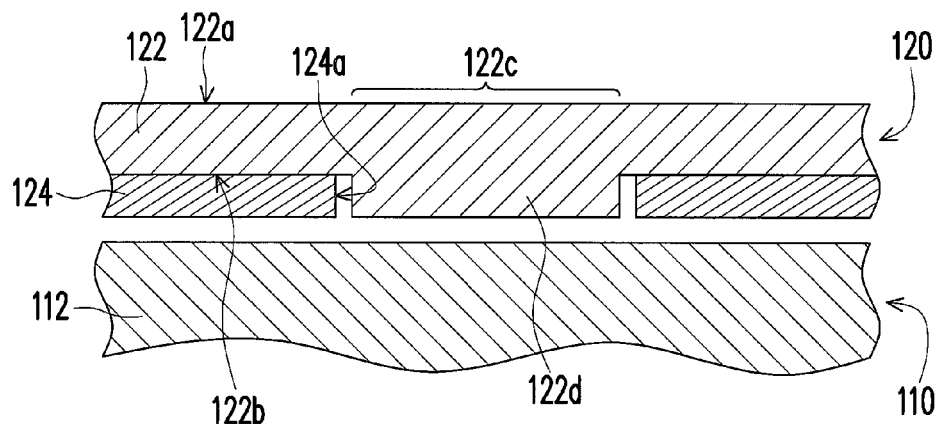
FIG. 4 is a schematic cross-sectional view illustrating a portion of the handheld device depicted in FIG. 1.
Figure 5:
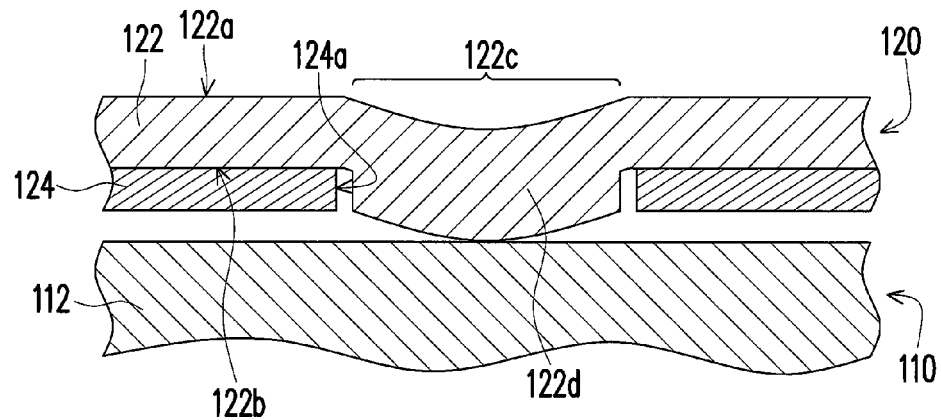
FIG. 5 is a schematic view illustrating that a force is exerted on the yielding layer depicted in FIG. 4, so that the yielding layer is deformed.

FIG. 4 is a schematic cross-sectional view illustrating a portion of the handheld device depicted in FIG. 1. FIG. 5 is a schematic view illustrating that a force is exerted on the yielding layer depicted in FIG. 4, so that the yielding layer is deformed. With reference to FIG. 3 and FIG. 4, the yielding layer 122 has an outer surface 122a and an inner surface 122b opposite to each other, and the inner surface 122b faces the back portion 112 of the body 110. The rigid layer 124 is located on the inner surface 122b of the yielding layer 122 and serves to lock the body 100. The rigid layer 124 has a hole 124a. The hole 124a exposes the back portion 112 and is covered by the yielding layer 122. When a portion 122c of the yielding layer 122 corresponding to the hole 124a is pressed, the portion 122c of the yielding layer 122 is elastically deformed, as shown in FIG. 5, such that the portion 122c of the yielding layer 122 closely leans on the back portion 112 via the hole 124a. The body 110 and the rigid layer 124 that are locked to each other are then released due to a force between the portion 122c of the yielding layer 122 and the back portion 112, such that the back cover 120 is able to depart from the body 110.

Under said configuration, a user may release the locked back cover 120 and body 110 by pressing the portion 122c of the yielding layer 122 corresponding to the hole 124a and exerting a force on the back portion 112 of the body 110 via the hole 124a. Thereby, the back cover 120 may be easily detached from the body 110. Since the hole 124a of the rigid layer 124 is covered by the yielding layer 122 and is not exposed to the external surroundings, the handheld device 100 may have a pleasing appearance.

According to the present embodiment, the yielding layer 122 and the rigid layer 124 are integrally formed. For instance, the yielding layer 122 and the rigid layer 124 are made of plastic and may be integrated via performing a dual-injection process. In other embodiments, the yielding layer 122 and the rigid layer 124 may also be integrated through adhesion or in any other appropriate manner, which may not be construed as a limitation to the disclosure.

With reference to FIG. 1 to FIG. 3, in this embodiment, the yielding layer 122 has a marking 122e on the outer surface 122a, and the marking 122e is aligned to the portion 122c of the yielding layer 122, so that a user may ascertain the location of the hole 124a. The marking 122e is a cavity or a protrusion formed on the outer surface 122a; alternatively, the marking 122e may be a film layer adhered to the outer surface 122a, which is not limited in the disclosure. According to other embodiments, it is likely not to configure the marking 122e, and thereby the outer surface 122a of the yielding layer 122 may have a simple and concise design.

Besides, the yielding layer 122 of this embodiment has an opening 122f, the back cover 120 further includes a decorative layer 126, and the decorative layer 126 is inlaid into the opening 122f. Thereby, the back cover 120 may be characterized by a variable appearance. According to other embodiments, it is likely not to configure the decorative layer 126 on the yielding layer 122, and the yielding layer 122 may have no opening 122f. As such, the outer surface 122a of the yielding layer 122 may have a simple and concise design. Note that the disclosure is not limited thereto.

Figure 6:
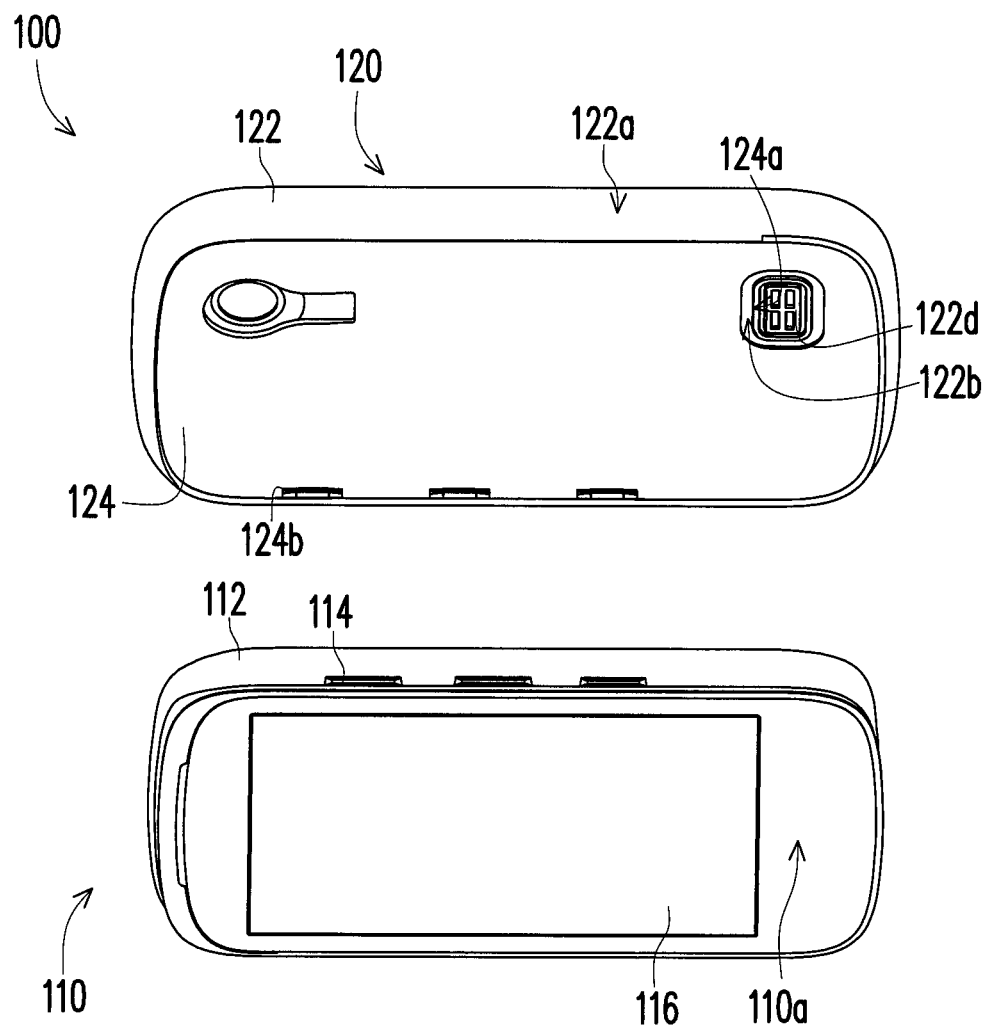
FIG. 6 is an explosive view illustrating the handheld device depicted in FIG. 1 at another viewing angle.
Figure 7:
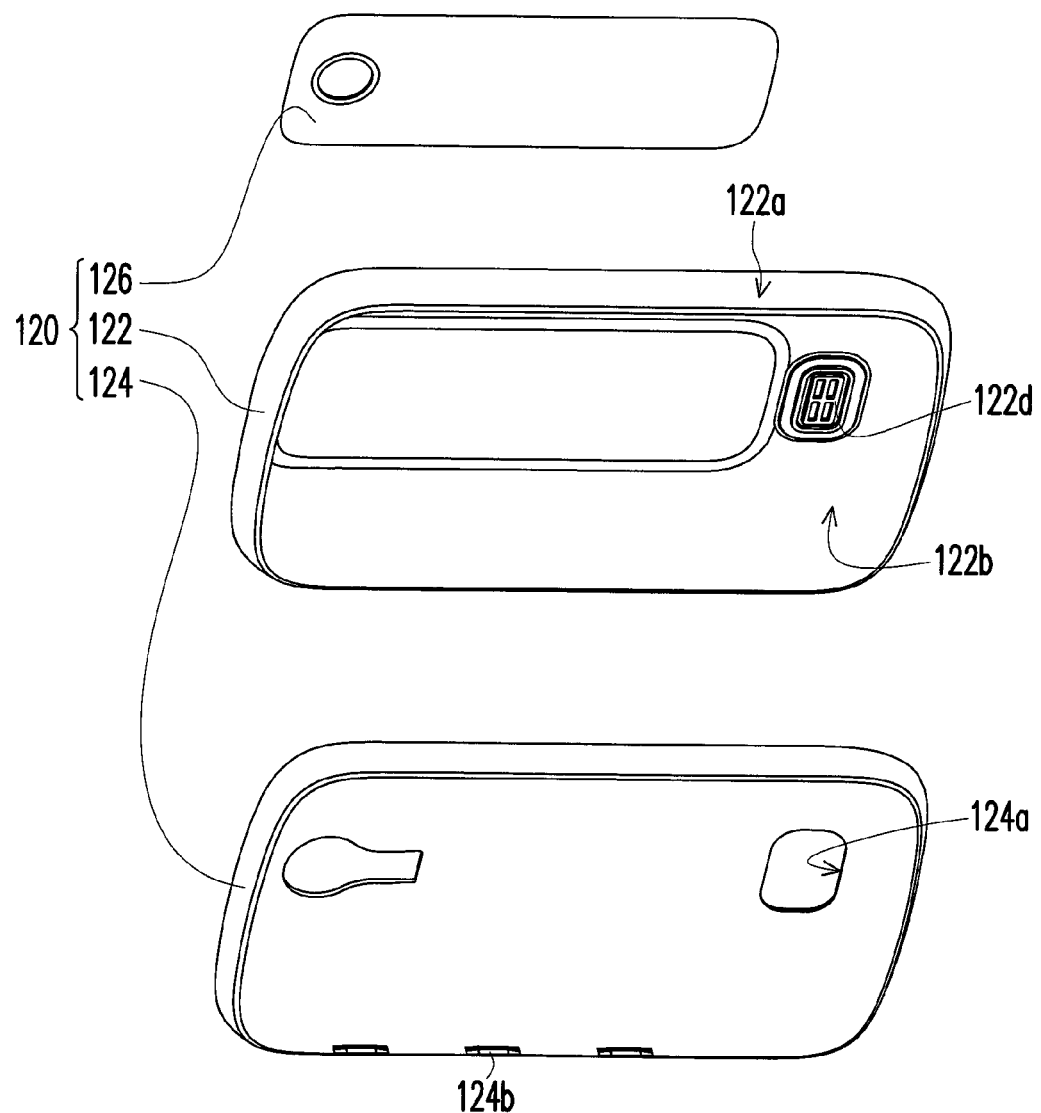
FIG. 7 is an explosive view illustrating the back cover depicted in FIG. 1 at another viewing angle.

FIG. 6 is an explosive view illustrating the handheld device depicted in FIG. 1 at another viewing angle. FIG. 7 is an explosive view illustrating the back cover depicted in FIG. 1 at another viewing angle. With reference to FIG. 4, FIG. 6, and FIG. 7, the portion 122c of the yielding layer 122 in this embodiment has at least one yielding protrusion rib 122d that faces the back portion 112, so as to prevent the portion 122c of the yielding layer 122 from sinking because of the overly large gap between the back portion 112 and the portion 122c. The appearance of the handheld device 100 may thus remain intact and undamaged. As shown in FIG. 5, when the portion 122c of the yielding layer 122 is pressed, a force may be exerted on the back portion 112 through the yielding protrusion rib 122d.

With reference to FIG. 6, specifically, the body 110 in this embodiment has a plurality of slots 114, the rigid layer 124 has a plurality of hooks 124b, and the hooks 124b are respectively locked to the slots 114, such that the rigid layer 124 is locked to the body 110.

Figure 8A:
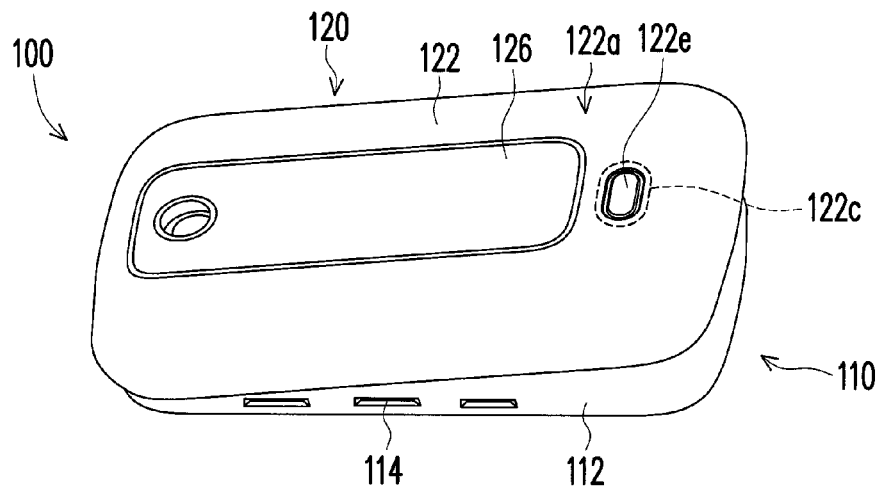
FIG. 8A and FIG. 8B are flow charts illustrating a process of detaching the back cover depicted in FIG. 1.
Figure 8B:
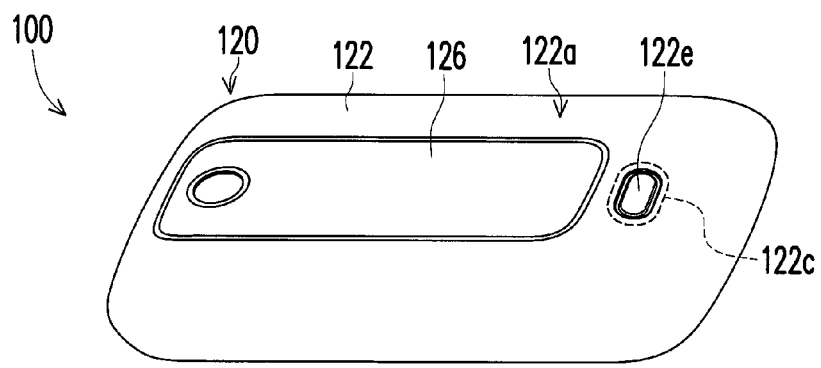
Figure 8B:
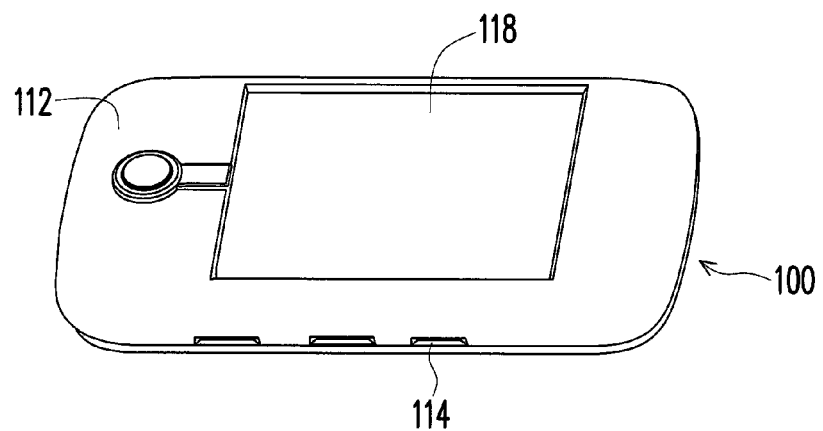

FIG. 8A and FIG. 8B are flow charts illustrating a process of detaching the back cover depicted in FIG. 1. When a user intends to remove the back cover 120, the portion 122c of the yielding layer 122 may be pressed down in a direction shown by the arrow in FIG. 1, and a force may be exerted on two sides of the yielding layer 122 to pull up the back cover 120. At this time, the force between the portion 122c of the yielding layer 122 and the back portion 112 of the body 110 may release the hooks 124b (shown in FIG. 6 and FIG. 7) from the slots 114 that are locked to the hooks 124b, such that the back cover 120 departs from the body 110, as indicated in FIG. 8A. The user may then detach the back cover 120 from the body 110, as indicated in FIG. 8B.

In this embodiment, the handheld device 100 is a mobile phone, for instance. As shown in FIG. 7, the body 110 has a front surface 110a and a display 116. The front surface 110a is away from the back portion 112, and the display 116 is located on the front surface 110a. Moreover, the body 110 includes a battery 118, as indicated in FIG. 2, the battery 118 is located in the back portion 112, and the back cover 120 serves to cover the battery 118. In other embodiments, the handheld device 100 may also be any other type of device, which may not be construed as a limitation to the disclosure.

In light of the foregoing, the back cover described in the embodiments of the disclosure is constituted by the yielding layer and the rigid layer. The rigid layer has the hole that exposes the back portion of the body. A user may release the locked back cover and body by pressing the portion of the yielding layer corresponding to the hole and exerting a force on the back portion of the body via the hole. Thereby, the back cover may be easily detached. The hole of the rigid layer is covered by the yielding layer and is thus not exposed to the external surroundings. Therefore, the handheld device may have a pleasing appearance.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A handheld device comprising:
    a body having a back portion, the back portion having a plurality of slots, the back portion having a rigid surface; and
    a back cover covering the back portion and comprising:
        a yielding layer having an outer surface and an inner surface opposite to each other, the inner surface facing the back portion; and
        a rigid layer located on the inner surface and having a plurality of hooks, the plurality of hooks locking to the plurality of slots of the back portion, the rigid layer having a hole exposing the back portion and covered by the yielding layer, a portion of the yielding layer covering the hole, extending toward the back portion via the hole, having at least one yielding protraction rib facing the back portion;
    wherein when the portion of the yielding layer corresponding to the hole is pressed and contacts with the rigid surface of the back portion, the yielding layer is pushed against the rigid surface via the hole and the portion of the yielding layer is elastically deformed, and the plurality of hooks are released from the plurality of slots due to a force between the portion of yielding layer and the back portion, such that the back cover is able to depart from the body.

2. The handheld device as recited in claim 1, wherein the yielding layer and the rigid layer are integrally formed.

3. The handheld device as recited in claim 1, wherein the yielding layer and the rigid layer are integrated through dual-injection.

4. The handheld device as recited in claim 1, wherein the yielding layer and the rigid layer are integrated through adhesion.

5. The handheld device as recited in claim 1, wherein the yielding layer has a marking on the outer surface, and the marking corresponds to the portion of the yielding layer.

6. The handheld device as recited in claim 1, wherein the hooks are respectively locked to the slots, such that the rigid layer is locked to the body.

7. The handheld device as recited in claim 1, wherein the body comprises a battery, and the battery is located in the back portion and covered by the back cover.

8. The handheld device as recited in claim 1, wherein the body has a front surface and a display, the front surface is away from the back portion, and the display is located on the front surface.

9. The handheld device as recited in claim 1, wherein the back cover further comprises a decorative layer, the yielding layer has an opening, and the decorative layer is inlaid into the opening.

\* \* \* \* \*